June 21, 1960  F. P. BUNDY  2,941,247
TWO-STAGE HIGH PRESSURE HIGH TEMPERATURE APPARATUS
Filed April 29, 1957  2 Sheets-Sheet 1

Inventor:
Francis P. Bundy,
by Paul G. Frank
His Attorney.

Inventor:
Francis P. Bundy,
by Paul A. Frank
His Attorney.

United States Patent Office 2,941,247
Patented June 21, 1960

2,941,247

TWO-STAGE HIGH PRESSURE HIGH TEMPERATURE APPARATUS

Francis P. Bundy, Schenectady, N.Y., assignor to General Electric Company, a corporation of New York Filed Apr. 29, 1957, Ser. No. 656,479

11 Claims. (Cl. 18—16.5)

This invention relates to a high pressure high temperature apparatus, and more particularly, to a high pressure high temperature apparatus employed to subject various specimen materials to very high temperatures and pressures for the study thereof and/or for the formation of more dense materials.

High pressure high temperature apparatuses, such as that disclosed and claimed in the copending application, Serial No. 448,050, filed Febrary 14, 1955, Howard T. Hall, are capable of producing the desired transformation or physical change of phase at pressures approaching 160,000 atmospheres, and for increased pressures these vessels were limited by their particular physical structure. However, it has been found desirable to study various reactions and transformations at increased pressures to 400,000 atmospheres or more if a suitable reaction vessel could be obtained to withstand the high pressures involved.

Accordingly, it is an object of this invention to provide an improved high pressure high temperature apparatus.

It is another object of this invention to provide an improved high pressure apparatus for maintaining pressures in the 150,000 to 400,000 atmosphere range.

It is yet another object of this invention to provide a two-stage high pressure apparatus for very high pressures.

Briefly described, in one form, this invention includes a high pressure apparatus such as a hydraulic press having a first pair of tapered anvils or punches, the space between the punches being surrounded by a first ring or belt to define a first chamber. Within this chamber there is positioned a second pair of tapered punches or anvils, the space between which is surrounded by a second inner belt or ring to define an inner chamber. The space between the exterior structure of the inner chamber and the walls of the first chamber is filled with a hydrostatic material in order to attain a two-stage pressure apparatus wherein the inner stage need only support the pressure difference between stages.

This invention may be better understood when taken in connection with the following drawings and its scope will be pointed out in the appended claims.

Figure 1:
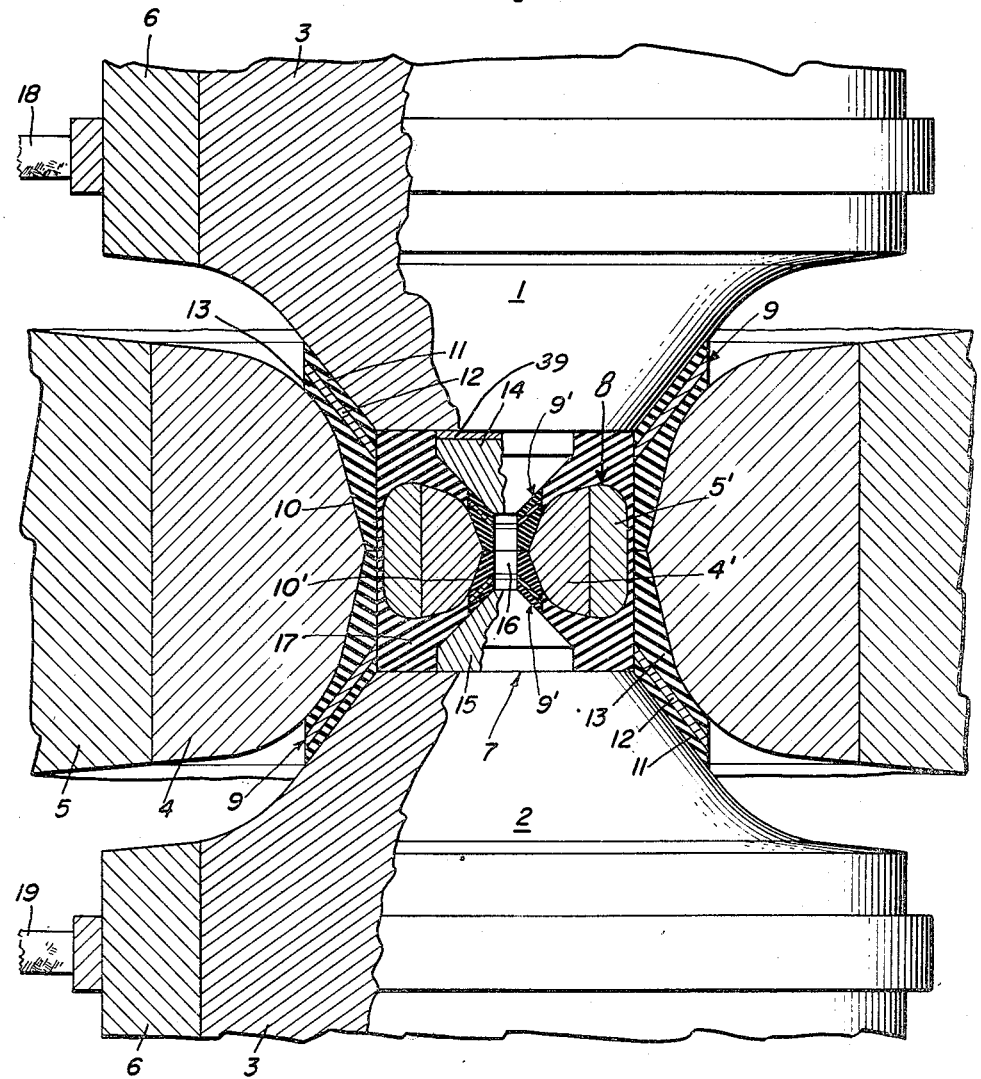
Fig. 1 is a first embodiment of this invention, illustrating a first reaction apparatus within a second reaction apparatus.

Referring now to Fig. 1, there are shown tapered anvils or punches 1 and 2 of a press or any well known hiigh pressure apparatus. In one form the tapered punches are depending from, or formed, on a cylindrical structure 3. In the press apparatus one or both of the tapered punches 1 and 2 may be made movable toward each other over a predetermined path, which path is encircled by an annular ring or belt 4 of steel or other material capable of withstanding the high lateral forces developed in the apparatus. Belt 4 has an inner tapered surface 10 best described as being receptive to the tapered punches or generally conforming thereto. For added protection and safety, ring 4 and the cylindrical structure 3 of the punches 1 and 2 are usually encircled by one or more additional annular rings 5 and 6 respectively. The punches 1 and 2 together with the ring 4 define a first chamber 7 into which an additional apparatus 8 to be hereinafter described is placed.

In order effectively to seal apparatus 8 in the chamber 7, to prevent extrusion thereof, and to resolve the purely lateral and axial forces developed by the press, a gasket assembly 9 is employed in combination with a particular interior surface configuration 10 of ring 4. The aforementioned specific gasket assembly 9 and surface configuration 10 form no part of this invention, being described and claimed in the above-mentioned copending application, Serial No. 448,050. However, for the presentation of this invention, it appears desirable to describe these features in more detail. A pair of frustoconical or tapered washers 11 of catlinite, pyrophyllite, or other electrically non-conducting material of a desirable compressibility characteristic are mounted on the frustoconical or tapered surfaces of the punches 1 and 2. Thereafter, a metal frustoconical or tapered washer 12 is mounted on each of the above-mentioned tapered non-conducting washers 11. A further substantially frustoconical or tapered washer 13 of the same material as washer 11 is positioned over each metal washer 12. The latter described washers 13 project from the punches 1 and 2 into the central chamber and adjacent ring surface 10, and meet in abutting relationship within the chamber 7. It is to be noted that the gasket assembly 9 permits the movement of one or the other punch toward each other, since the gasket material of catlinite or pyrophyllite permits a substantial reduction under compression without undue spalling and resultant loss of seal, or without deteriorating in a manner to permit a flow of current from the punches 1 and 2 to the ring 4, as is hereinafter explained and described.

The inner surface configuration 10 of ring 4 resolves the purely lateral and axial forces developed within the apparatus into a plural directional force acting perpendicular to and along the curved surface 10. For example, high lateral force may be developed to a degree which would, under normal conditions, cause ring 4 to split or fracture. In the invention as disclosed, this high lateral force is caused to bear on inner surface 10 of ring 4 in a plurality of angular directions resolved from the purely lateral force, and the resolved compressive force contributes to the inherent strength of ring 4 for added fracture safety and increased force-withstanding ability.

The apparatus 8 within chamber 7 comprises an additional second pair of frustoconical or tapered punches 14 and 15 which are positioned concentrically on tapered punches 1 and 2 with the bases of punches 14 and 15 adjacent the faces of punches 1 and 2. Punches 14 and 15 alternately may be integral with or be projections of punches 1 and 2. Mounted on each of the said punches 14 and 15 is a gasket assembly 9' similar in all respects except to size to gasket assembly 9. Concentric with the punches 14 and 15 and spaced from ring 4 and punches 1 and 2 is a second inner ring 4' encircled by an additional strengthening ring 5'. The described parts of the gasket assembly 9', rings 4' and 5', together with the internal belt surface 10' are similar to their counterparts 4, 5, 9, and 10 in all respects except as to size, and cooperate to perform the same functions as that heretofore described for the counterparts, including the defining of an additional central or inner chamber 16.

The remaining space about the ring 5' and belt 4', in the first chamber, is filled with a hydrostatic material 17 which is electrically non-conductive and capable of flowing as freely as possible under high pressure conditions. Among the various materials which may be employed in this invention are to be included, by way of example, silver chloride, silver sulphate, talc stone, and various others, too numerous to mention. Due to the high pressures which must be generated in this invention the hydrostatic material 17 when applicable may be employed in the liquid state to be poured into or cast in the described space. Alternately, however, when material 17 is of the talc stone variety, it may comprise two or more parts which are then placed in position. Chamber 16 may contain a reaction vessel such as disclosed and claimed in the above-mentioned copending application, Serial No. 448,050. The reaction vessel is arranged to contain a specimen of some material which is an object of study under high pressure high temperature conditions or which is designed to undergo a physical change of phase or transformation which increases its inherent density. By way of example and not of limitation are the processes of graphite to diamond and those in which various other materials may be employed to produce precious and semi-precious stones, or processes which give either a chemical or physical change to existing materials to provide new materials with added characteristics.

In conjunction with the high pressures involved, resistance heating is generally utilized to acquire high temperatures. The high resistance is obtained by having a reduced flow path, for the current within the specimen or alternately by a resistance heater in the vessel. The circuit includes a pair of leads 18 and 19 connected from a suitable power source, not shown, to punches 1 and 2. From one of the leads, say 18, current is conducted through punch 1, through punch 14, to the reaction vessel. Thereafter, the current is caused to flow through the reaction vessel in chamber 16, and therein through the specimen under consideration, thence through punch 15, punch 2, and lead 19. Short circuiting or other paths of current flow, for example, between rings 5' and 4, is prevented by the use of the non-conducting gasket materials, as heretofore described together with the non-conducting hydrostatic material 17. The gasket material of pyrophyllite or catlinite is characteristically non-conductive under high temperatures, and maintains uniformity under compression without undue spalling.

It should now be apparent that the system or apparatus of this invention is a two-stage cascade system or a system having one pressure cell within another. The important principle involved is that the second or internal stage is completely submerged in the hydrostatic pressure field generated by the first stage through the hydrostatic material 17 which changes to a generally fluid acting form under high pressures and high temperatures. Thus, the walls and gaskets of the second stage system need only support the pressure difference between the first or outer stage and the second or inner stage.

In the operation of this invention when assembled as described, the temperature is increased in the reaction cell by resistance heating, while pressure is increased by movement of one of the punches or both to decrease their spaced apart dimension.

Figure 2:
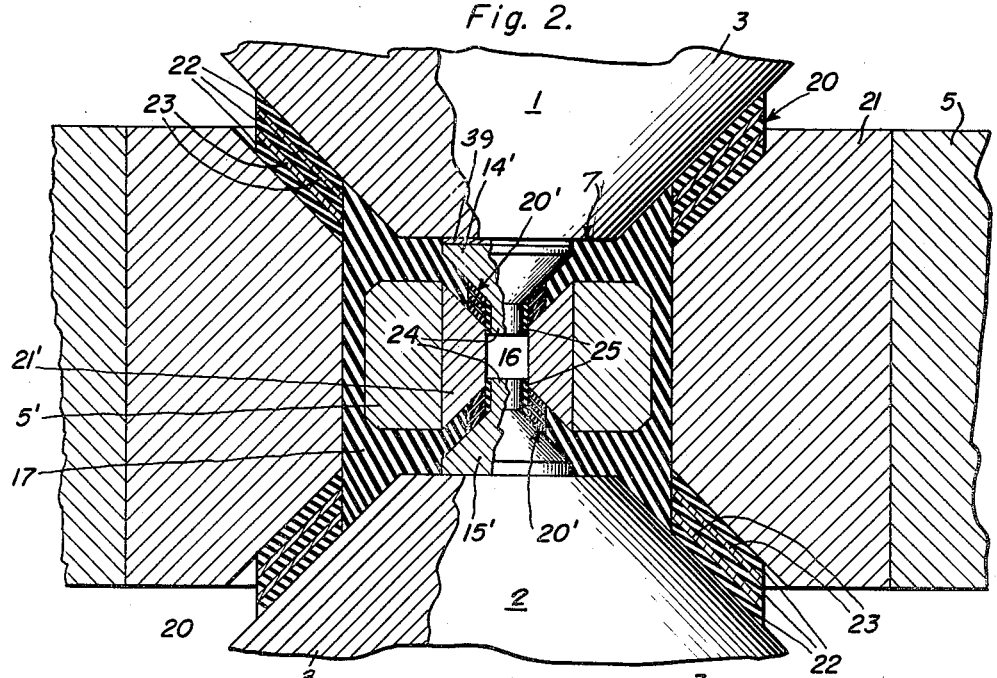
Fig. 2 is a second embodiment of Fig. 1.
Figure 3:
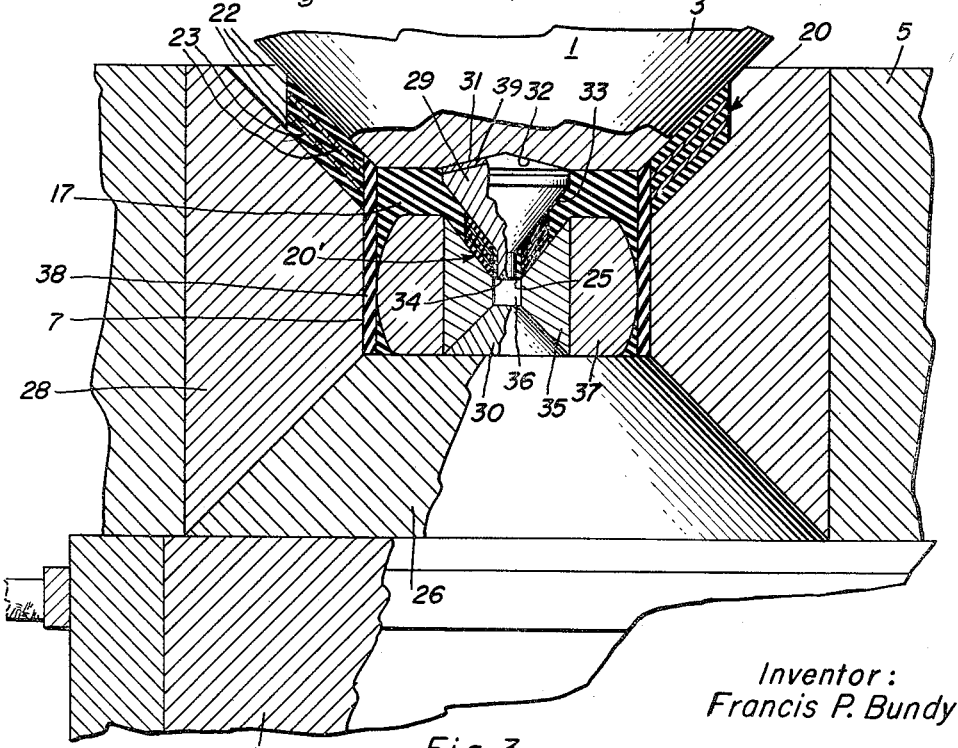
Fig. 3 shows a single ended apparatus employed for a dual stage pressure.

In order to provide for the concurrent pressure rise without a failure of the gaskets due to the differential in pressure between the first and inner chamber, the material 17 and the gasket assemblies 9 and 9' must be proportioned in volume and dimension in order that the stroke displacement and the loading requirement is properly correlated. During the pressure rise, the pressure in the reaction vessel or inner chamber 16 should be greater than that in the material 17, but not sufficiently greater to cause gasket assembly 9' to slip or otherwise fail. Furthermore, peak pressures in material 17 and in chamber 16 should be arrived at simultaneously. One method which has given satisfactory results in this invention is to maintain pressures in chamber 16 approximately twice that of the pressure in material 17 during pressure rise conditions, or, alternatively, to place between the punches such as between punches 1 and 14, where separate, a washer 39 of predetermined compressibility as illustrated in Figs. 1 through 3. It is basically understood that high pressure is developed through movement or stroke of one of the punches. Therefore, in the first instance, pressure may be proportioned between stages by suitable choice of compressibility of materials or length of the chambers upon which the punches have the same stroke. Proportionality is facilitated by the washer 39 which, by failing or compressing, permits a stroke of, for example, the inner punch to be different from the outer punch.

This invention is readily adaptable to other modifications, such as shown in Figs. 2 and 3.

Referring now to Fig. 2, there is described a modification of the invention of Fig. 1. Gasket assemblies 20 and 20', on punches 1 and 2, 14' and 15', and adjacent rings 21 and 21' include at least three non-conducting washers 22 and at least two metal washers 23. These gasket assemblies are differentiated from the gasket assemblies 9 and 9' of Fig. 1 in that there is no extension of a non-conducting gasket 13 into the chambers 7 and 16.

Rings 21 and 21' are modifications of rings 4 and 4' in the showing of an inwardly projecting frustoconical cross-section, and tapered punches 14' and 15' are modifications of tapered punches 14 and 15 in their inclusion of cylindrical nibs or cylinders 24, together with insulating cylinders 25 thereon, which extend into the chamber 16. The disclosure of Fig. 2 permits, with the additional gasket assembly thickness, a longer stroke of one of the punches, while the nibs 24 project into and reduce the initial volume of chamber 16 and also protect the gasket assemblies 20 from initial failure.

In Fig. 3 the two-stage apparatus is employed in conjunction with the well known, single ended apparatus. In a single ended apparatus, the force exerted by the punch is what may be described as unidirectional, with no return force or pressure equalizing base, and therefore oppositely mounted gaskets, such as 9 and 9' are not necessary. The first or outer chamber 7 is formed by a frustoconical base 26, positioned in a support 27, and encircled by an inner projecting frustoconical ring 28, one of the tapered surfaces of which lies adjacent the tapered surface of base 26. A gasket assembly 20 is positioned between the tapered surface of the punch 1 and the corresponding tapered surface of ring 28. Within the chamber defined by the ring 28 and punches 1 and 26, an additional or second pair of punches 29 and 30 are mounted in spaced apart relationship and concentric to punches 1 and 26. The lowermost punch 30 may be a protruding part of base 26, or one separate therefrom, while punch 29 may be separate or integral with punch 1. In one preferred form of this invention, punch 29 is illustrated as a cylinder having a conical surface 31 extending from one face and positioned within a comparable conical indentation 32 in punch 1. A conical surface 33 extends oppositely from the base to include a cylindrical projection or nib 34 at the outermost part of the surface 33. A cylindrical gasket 25 encircles the nib 34. Between punches 29 and 30 there is concentrically positioned an inwardly projecting frustoconical surface ring 35 having external and internal vertical walls. The punches 29 and 30 together with the ring 35 define a central or inner chamber 36 which is sealed by a gasket assembly 20 between upper punch 29 and ring 35. The gasket assembly 20 includes a plurality of non-conducting washers 22 interspaced with metal washers 23 together with a non-conducting sleeve 25 on the cylindrical projection 33. Ring 35 is encircled by a strengthening ring 37 whose external wall is arcuate and spaced from ring 28. The lower surface of strengthening ring 37 rests upon punch 26. Between strengthening ring 37 and ring 28 there is positioned a non-conducting cylindrical sleeve 38 while the remaining space between the arcuate wall of strengthening ring 37 and sleeve 38, and between the upper end of the rings 35 and 37 and punch 1 is filled with a suitable hydrostatic material 17, as described for Figs. 1 and 2.

While other modifications of this invention and variations of apparatus that may be employed within the scope of the invention have not been described, the invention is intended to include all such as may be embraced within the following claims.

What I claim as new and desire to secure by Letters Patent of the United States is:

1. A dual stage high pressure apparatus comprising in combination, a pair of punches one of which is movable toward the other, and annular ring concentric with and between said punches to define a first chamber therewith into which the movable punch progresses, for a first pressure stage, sealing means between and engaging said movable punch and said ring, a second ring concentric with, spaced from, and within said first ring, sealing means between and engaging the movable punch and said second ring to define an inner chamber into which the movable punch progresses for a second pressure stage, said inner chamber being adapted to contain a specimen to be subjected to high pressure conditions, and a substantially hydrostatic material filling the remaining space in said first chamber to provide substantially hydrostatic transmission of pressure from the first to the second stage.

2. In a high pressure high temperature apparatus a combination comprising, a frustoconical base, a tapered punch movable toward said base, a first ring adjacent said base and concentric with said tapered punch to define a chamber therewith as a first stage, the internal surface of said belt being of a substantially frustoconical cross-sectional configuration, a gasket assembly between the frustoconical surface of said ring and the tapered surface of said punch, a second tapered punch mounted concentrically in a depression in the base of said first punch, a cylindrical nib on said second punch projecting into said chamber, a second frustoconical base adjacent said first base and concentric thereto, a second ring positioned concentrically between said second punch and said second base to define an inner chamber therewith as a second stage, the inner surface of said ring being of a frustoconical cross-sectional configuration, said second ring being spaced from said first ring and said punches, a gasket assembly between said second punch and said second ring, a high pressure high temperature substantially hydrostatic pressure transmitting material filling space to transmit pressures between said first and said second stages, and means to conduct an electrical current through said punches to said inner chamber.

3. In a high pressure high temperature apparatus the combination comprising, a first frustoconical base, a first frustoconical punch having a cylindrical base, at least one strengthening ring surrounding the cylindrical structure of said punch, a ring positioned concentrically with said base and said punch to define therewith a chamber as a first stage, at least one strengthening ring surrounding said ring, the inner surface of said ring being of a substantially cross-sectional frustoconical configuration, a plurality of electrically non-conducting gaskets between said punch and said ring, a cylindrical gasket adjacent the wall of said chamber, a second frustoconical base mounted concentrically with said first base and within said chamber, a second punch mounted concentrically with said first punch and positioned within a depression therein, a second ring surrounding said second base and said second punch to define therewith an inner chamber as a second stage, the inner surface of said second ring being of a substantially cross-sectional frustoconical configuration, at least one second strengthening ring surrounding said second ring, said second strengthening ring and said second ring being adjacent said first base, a plurality of electrically non-conducting gaskets between said second punch and said second ring, a cylindrical projection on said second punch extending into said inner chamber, a cylindrical gasket surrounding said cylindrical projection, a high pressure high temperature substantially hydrostatic pressure transmitting material filling the remaining space in said first chamber to transmit pressure between said first and said second stages, and means to conduct an electrical current through said punches and said base to said inner chamber.

4. A dual stage high pressure high temperature apparatus comprising in combination, a pair of oppositely mounted spaced apart tapered punches one of which is adapted to move toward the other, a first metal ring mounted between and concentric with said punches, said metal ring having an inner tapered wall generally conforming to the taper of said punches, said ring and said punches defining a first chamber into which the movable punch progresses as a first pressure stage, gasket means positioned between and engaging the taper of said punches and the tapered wall of said ring, a second metal ring between and concentric with said punches and spaced within said first ring, said second ring having an inner tapered wall conforming to the taper of said movable punch, said second ring and said punch defining an inner chamber to contain a specimen material and into which said movable punch progresses as a second pressure stage, gasket means between and engaging the taper of said movable punch and the tapered wall of said second metal ring, a substantially hydrostatic pressure transmitting material filling the space remaining in said first chamber to provide substantially hydrostatic pressure transmission between said first and said second pressure stages and means to raise the temperature in said inner chamber.

5. A dual stage high pressure high temperature apparatus comprising in combination, a pair of oppositely mounted spaced apart tapered punches one of which is adapted to move toward the other, a first metal ring positioned between and concentric with said punches, said metal ring having an inner tapered wall generally conforming with the taper of said punches and defining therewith a first chamber into which the movable punch progresses as a first pressure stage, electrically insulating gasket means positioned between and engaging the taper of said punches and the tapered wall of said ring, a second metal ring positioned between and concentric to said punches and spaced within said first ring, said second ring having an inner tapered wall generally conforming to the tapered surface of said movable punch, electrically insulating gasket means positioned between and engaging the tapered wall of said ring and the tapered surface of said movable punch, said second ring and said punches defining an inner chamber to contain a specimen material as a second pressure stage, a substantially hydrostatic pressure transmitting material filling the remaining space in said first chamber to provide substantially hydrostatic transmission of pressure between said first and said second pressure stages, and means for conducting electrical current to said inner chamber for heating thereof.

6. A dual stage high pressure high temperature apparatus comprising in combination, a first pair of oppositely mounted spaced apart tapered punches one of which is adapted to move toward the other, a first metal ring having its inner wall tapered to generally conform with the taper of said punches and positioned between and concentric with said punches to define a first chamber into which the movable punch progresses, gasket means positioned between and engaging the tapered wall of said ring and the taper of said punches, a second pair of tapered punches in said first chamber positioned on and concentric with said first pair of tapered punches and said first ring, a second metal ring having its inner wall tapered to generally conform to the taper of said second punches and positioned between and concentric with said second pair of tapered punches, said second ring and said second punches defining an inner second pressure stage chamber to contain a specimen material, gasket means positioned between and engaging the tapered wall of said second ring and the taper of said second pair of punches said second ring being spaced within said first metal ring and from said first pair of punches, a substantially hydrostatic pressure transmitting material filling the space remaining in said first chamber to provide substantially hydrostatic transmission of pressure between said first and said second pressure stages, and means to raise the temperature in said inner chamber.

7. A dual stage high pressure high temperature apparatus comprising in combination, a first pair of oppositely mounted spaced apart tapered punches one of which is adapted to move toward the other, a ring having its inner wall tapered to generally conform with the taper of said punches positioned between and concentric with said tapered punches to define therewith a first pressure stage chamber into which the movable punch progresses, electrically insulating gasket means positioned between and engaging the tapered surface of said ring and the taper of said punches, a second pair of tapered punches in said chamber positioned on and concentric with said first pair of tapered punches and said first ring, a second ring having its inner wall tapered to generally conform to the taper of said second punches and positioned between and concentric with said second pair of tapered punches, said second pair of punches and said second ring defining a second pressure stage chamber to contain a specimen material, electrically insulating gasket means positioned between and engaging the tapered surface of said second ring and the taper of said second pair of punches, a substantially hydrostatic pressure transmitting material filling the remaining space in said first chamber to transmit pressure from the first to the second pressure stage, and means to conduct an electrical current through said punches to said inner chamber.

8. A dual stage high pressure high temperature apparatus comprising in combination, a first pair of oppositely mounted spaced apart tapered punches one of which is adapted to move toward the other, a ring having its inner wall tapered to generally conform with the taper of said punches positioned between and concentric with said tapered punches to define therewith a first pressure stage chamber into which the movable punch progresses, electrically insulating gasket means positioned between and engaging the tapered surface of said ring and the taper of said punches, a second pair of tapered punches in said chamber positioned on and concentric with said first pair of tapered punches and said first ring, a second ring having its inner wall tapered to generally conform to the taper of said second punches positioned between and concentric with said second pair of tapered punches, said second pair of punches and said second ring defining a second pressure stage chamber to contain a specimen material, electrically insulating gasket means positioned between and engaging the tapered surface of said second ring and the taper of said second pair of punches, a substantially hydrostatic pressure transmitting material filling the remaining space in said first chamber to transmit pressure from the first to the second pressure stage, means to conduct an electrical current through said punches to said inner chamber, and means proportioning the pressure between the first and second pressure stages.

9. A dual stage high pressure high temperature apparatus comprising in combination, a first pair of oppositely mounted spaced apart tapered punches one of which is adapted to move toward the other, a ring having its inner wall tapered to generally conform with the taper of said punches positioned between and concentric with said tapered punches to define therewith a first pressure stage chamber into which the movable punch progresses, electrically insulating gasket means positioned between and engaging the tapered surface of said ring and the taper of said punches, a second pair of tapered punches in said chamber positioned on and concentric with said first pair of tapered punches and said first ring, a second ring having its inner wall tapered to generally conform to the taper of said second punches positioned between and concentric with said second pair of tapered punches, said second pair of punches and said second ring defining a second pressure stage chamber to contain a specimen material, electrically insulating gasket means positioned between and engaging the tapered surface of said second ring and the taper of said second pair of punches, a substantially hydrostatic pressure transmitting material filling the remaining space in said first chamber to transmit pressure from the first to the second pressure stage, means to conduct an electrical current through said punches to said inner chamber, and means proportioning the pressure between the first and second pressure stages, said proportioning means comprising a predetermined compressible member between one of said first pair of punches and its adjacent second punch.

10. A dual stage high pressure high temperature apparatus comprising in combination, a first pair of oppositely mounted spaced apart tapered punches one of which is adapted to move toward the other, a ring having its inner wall tapered to generally conform with the taper of said punches positioned between and concentric with said tapered punches to define therewith a first pressure stage chamber into which the movable punch progresses, electrically insulating gasket means positioned between and engaging the tapered surface of said ring and the taper of said punches, a second pair of tapered punches in said chamber positioned on and concentric with said first pair of tapered punches and said first ring, a second ring having its inner wall tapered to generally conform to the taper of said second punches positioned between and concentric with said second pair of tapered punches, said second pair of punches and said second ring defining a second pressure stage chamber to contain a specimen material, electrically insulating gasket means positioned between and engaging the tapered surface of said second ring and the taper of said second pair of punches, a substantially hydrostatic pressure transmitting material filling the remaining space in said first chamber to transmit pressure from the first to the second pressure stage, and means to conduct an electrical current through said punches to said inner chamber, said electrical insulating gasket means defining the annular walls of their respective chambers.

11. A two-stage high pressure high temperature apparatus comprising in combination, a first pair of oppositely mounted frustoconical punches one of which is adapted to move toward the other, a ring positioned between and concentric to said first pair of punches to define a chamber into which said movable punch progresses as a first pressure stage, said ring having an internal surface of frustoconical cross-sectional configuration, electrically non-conducting gasket means positioned between concentric with and engaging the frustoconical surfaces of said punches and the frustoconical surfaces of said ring, a second pair of frustoconical punches positioned within said chamber and concentric with said first pair of punches and said ring, a second ring spaced within said first ring and from said first punches and concentric therewith to define an inner chamber for a second pressure stage, said second pair of punches having cylindrical nibs thereon projecting into said inner chamber, electrically non-conductive frustoconical gasket means between concentric with and engaging the frustoconical surfaces of said inner ring and the frustoconical surfaces of said second pair of punches, a substantially hydrostatic pressure transmitting material filling the remaining space in said first chamber, and means to conduct an electrical current through said punches to said inner chamber.

(References on following page)

References Cited in the file of this patent

UNITED STATES PATENTS

| | | |
|---|---|---|
| 2,195,297 | Engle | Mar. 26, 1940 |
| 2,360,528 | Talmage | Oct. 17, 1944 |
| 2,544,414 | Bridgman et al. | Mar. 6, 1951 |

OTHER REFERENCES

Bridgman: "Am. Acad. of Arts and Sciences," vol. 74, No. 3, pages 21–28 (October 1940).

Bridgman: "Review of Modern Physics," vol. 18, No. 1, pages 1–9, 25, 34, 79–88 (1946).

Bridgman: "J. Chem. Physics," vol. 15, No. 2, pages 92–98 (February 1947).

Seybolt et al.: "AECD–2679," declassified August 18, 1949, page 6. Technical Information Branch, Oak Ridge Extension AEC, Oak Ridge, Tenn.